C. A. KRAUS.
INSULATING JOINT.
APPLICATION FILED AUG. 27, 1909.
1,070,614.
Patented Aug. 19, 1913.
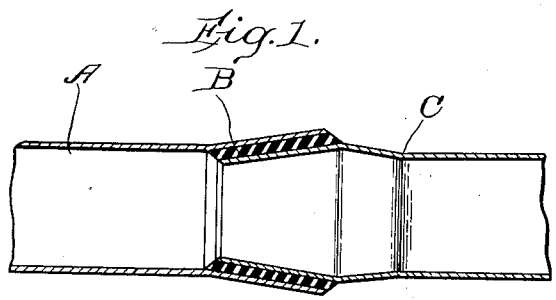
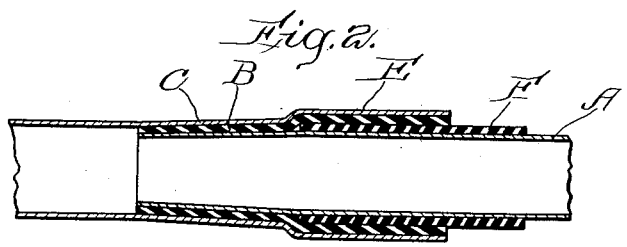
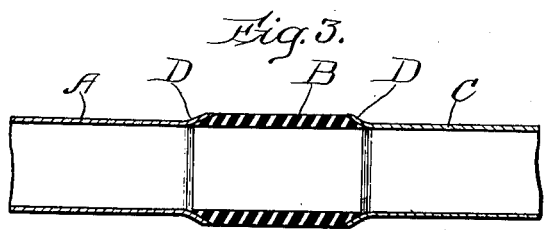

UNITED STATES PATENT OFFICE.

CHARLES A. KRAUS, OF NEWTON HIGHLANDS, MASSACHUSETTS.

INSULATING-JOINT.

1,070,614.　　　　　Specification of Letters Patent.　　Patented Aug. 19, 1913.

Application filed August 27, 1909. Serial No. 514,859.

*To all whom it may concern:*

Be it known that I, CHARLES A. KRAUS, a citizen of the United States, and resident of Newton Highlands, in the county of Middlesex and State of Massachusetts, have invented new and useful Improvements in Insulating-Joints, of which the following is a specification.

My invention relates to the construction of gas-tight joints between metallic members formed by means of a thermally and electrically insulating separator or intermediary, and the object of my invention is to produce effective joints of this type impervious to gases, capable of resisting the stresses due to mechanical shock and thermal changes, and also which shall possess in an efficient degree the quality of electrical and thermal insulation.

Particularly my invention relates to such joints as are liable to be subjected to high temperatures, whereunder the use of organic or other readily disintegrable materials is out of the question.

The chief difficulties heretofore encountered in making such joints as are contemplated in connection with my invention, are lack of intimate union between the surfaces of metals and the refractory insulating separator or intermediary and the liability of the intermediary to fracture by reason largely of differences in coefficient of thermal expansion and improper cooling. By my invention herein to be described, thermally and electrically insulating joints between metallic members may be made which are adapted to the conditions alluded to.

In the drawings hereto annexed which illustrate examples of my invention,—Figure 1 is a view in cross section of an insulating joint between two tubular members; Fig. 2 is a cross sectional view of a joint similar to that shown in Fig. 1 but specifically modified therefrom; and Fig. 3 is a cross sectional view of a butt joint made between two metallic tubular members.

Since my invention applies peculiarly to the manufacture of gas-tight joints, usually one at least of the metallic members involved in such a joint will be tubular in form. In the figures herein shown to illustrate my invention, both metallic members are shown as tubular in form. This is not necessarily the case, but in general it will be found advantageous to employ cylindrical and therefore symmetrical members when possible.

In the simple illustration of my invention shown in Fig. 1, two metallic members A and C, which are of symmetrical form are selected. Their dimensions are such that one member, as C will freely enter the other member A; the members A and C are here shown as conically tapered and flared at their ends for this purpose, the member C extending into the member A for some distance. The space between the two members is filled with vitreous or similarly refractory material B which is intimately fused to both members. In order that the union between these parts should remain intimate and preserve its integrity when the joint as a whole is exposed to temperature changes, either in the course of manufacture or afterward, it is advisable that the insulating member B should normally be subjected to no tension. This condition may be secured by selecting, compounding or modifying the several members, in such manner that the coefficient of expansion of any member is greater than that of the member included in, or embraced by it. A joint composed essentially of two concentric metallic members, of which the inner has the smaller coefficient of expansion, and an insulating member lying between the two metal members, constitutes an example of this permanent compression condition, which I regard as an important characteristic of joints which embody my invention in its fullest expression.

If the two metal members possess the same coefficient of expansion, a condition of structural permanency is obtained by using an intervening insulator which has the same coefficient of expansion; but in most instances it will be preferable to employ an insulating member of smaller coefficient of expansion than the metal member which embraces it, and, in case the metal member embraced by it has also a larger coefficient of expansion than the insulator, the condition favorable to the permanent integrity of the joint may be obtained in the process of manufacture, by cooling the inner metal member more rapidly than the members which embrace it, so as to produce an internal compressive stress in the finished joint.

In the construction of joints such as above described, one is not restricted to the use of metal members having thin walls such as might stretch under the strains due to cooling; steel tubes having walls $\frac{1}{16}$ of an inch thick may be successfully employed to form joints of this character. The feasibility of employing relatively thick and strong metal members is of advantage, since great mechanical strength is thereby afforded; and moreover, the process of manufacture is thereby simplified in so far as it is possible thus to omit those precautions in heating the metals as would have to be employed in the case of very thin members in order to prevent excessive oxidation.

Not only should the integrity of the insulating intermediary be secured by precautions such as above stated, but further measures must be adopted to provide for an intimate union between the refractory intermediary and the metal surfaces in order that no leakage, however small, shall take place between the adjacent members. When oxidizable metals such as iron or steel are employed, a considerable amount of oxid appears on their surfaces or is formed there before the insulating member can be applied; and moreover, gases are almost invariably present in the metal itself, and these are given off on heating the metal during the application of the insulating member. In order, therefore, to correct these conditions which are hostile to the obtainment of a satisfactory result, before the intermediary member B is introduced between the metal surfaces, both these metal surfaces are heated and coated with a relatively fusible vitreous material which with the metal is heated to such a temperature that the vitreous coating becomes sufficiently fluid to readily dissolve the oxid on the surface of the metal members. The readiness of fusibility of such a vitreous flux is, of course relative and variable, and is defined with reference to the physical and structural character of the metal members to which it is applied. Its fusibility should be such that it may be rendered fluid and dissolve the oxid at a temperature not so high as injuriously to affect the metal member itself. The process of solution of the oxid may be hastened by suitable mechanical manipulation of the flux. While the process of fusing the vitreous coating and the dissolving of the metal oxid is going on, gases are driven out of the walls of the metal and collect in bubbles under the vitreous coating, but since this coating is fluid these bubbles escape through the vitreous material and a layer of the vitreous flux free from bubbles is intimately fused on the metal. In general it will be found preferable to coat the metal surfaces with a layer of vitreous material which is more readily fusible than is the intermediary member B, because in this way the necessary fluidity is obtained at a temperature sufficiently low to facilitate the application of the member B. This member may, to be sure, in some instances, be made of material as readily fusible as the vitreous flux or coating, or may be of the same material, but it is preferable to employ a more refractory body for this separator or intermediary. One reason for this lies in the fact that the more readily fusible the intermediary the better as a rule will it conduct electricity. Then again, it is desirable that the insulating intermediary shall retain its form in the process of making the joints. Thus in making a joint like that shown in Fig. 1, the vitreous oxid-flux having been applied to the metal members, these members are united by pressure with the intermediary B between them. If this intermediary were readily fusible it would be liable in such process to be squeezed out of its proper place in the joint. Also it is desirable to reduce as far as possible the temperature at which permanent stresses begin to appear, and by employing relatively easily fusible material in combination with the metal members and a more refractory separator, this temperature is reduced to that at which the more fusible material becomes substantially rigid or solid. That is to say, I employ as the joining or sealing material between two juxtaposed members of the joint a vitreous material which possesses a melting point lower than that of either of the members with which the said vitreous joining or sealing material is fused into intimate and hermetical contact. In strict technicality the actual melting point of a glass which passes through gradations of fluidity as temperature rises, may not be susceptible of precise statement; in speaking of the melting point of the vitreous material employed in these joints, this is meant:—that the said vitreous material or glaze reaches a condition of manipulable fluidity at a temperature lower than that at which either of the adjoining members reaches a similar condition.

While it will often be found convenient to make the insulating intermediary B of glass, it may be found desirable in some cases to employ other materials, not so homogeneous, with the oxid-flux. Thus a semi-vitreous or fritted material, as for example, porcelain, "lavite", magnesium oxid, etc., may be employed. If the material used is porous, it may be glazed so as to be impervious to gases.

Referring to Fig. 2 which illustrates a modified form of joint made according to my invention, A represents a steel tube whereof the end is contracted in slightly conical taper; C is a metal tube having a slight conical flare which fits over the conical contraction of the tube A. The tube C is further enlarged as at E so as to form a sleeve. The tube throughout its tapered portion and on the inside of the sleeve E, is continuously lined with a vitreous coating B, which may be of glass, joined to tube C and the extension E in the following manner. This tube is first heated and a layer of borax applied to the interior thereof until by the fusion of the borax the film of oxid on the steel surface is completely dissolved. The glass member B which has previously been shaped so as to fit the tube C and its extension at E, is now introduced and the borax coated steel tube is heated in a blow-pipe flame until the glass lining B begins to soften. Surface tension draws the glass outward and by gradually passing the tube through the flame the glass will be attached firmly to the walls of the tube throughout its entire length. It may be found preferable during this process to employ a carbon or graphite pencil, and thereby as the glass and borax fuse together to squeeze the borax under the glass lining forward. The borax being very fluid is readily pressed into the cooler portions of the tube and bubbles of gas which are present will be carried along with the borax, leaving behind the glass tube firmly attached to the metal surface by a thin layer of borax. A tube lined as above described may be then allowed to cool without any extra precautions as to annealing and the glass will not crack. Moreover, the lined tube may be reheated without injury. The tube A having been coated with some readily fusible flux to dissolve the oxid, is then introduced into the lined tube C. For the purpose of coating the outside of the tube A, I preferably select a flux which has a coefficient of expansion approximating to that of steel, in order that it may not crack off at any part which is not supported by the walls of the outer tube CB. The tube A being thus prepared and introduced into the lined outer tube, is heated, and when the flux on the tube A has acquired the proper fluidity, considerable pressure is applied so as to squeeze out any excess of flux and to form an intimate union with the glass lining B. The flux on the tube A acts here not only as a solvent for the oxid on that tube, but also as a lubricant in the process of joining the two parts. Were this flux absent or were its melting point near to that of the lining B, the latter would be liable to be torn out of shape since it is impracticable to introduce the tube A so as to make contact at all points at the same time.

The provision of the extension or sleeve E is for additional electrical insulation. The air space between the two tubes is thereby increased; the insulation may still further be improved by slipping the tube F of glass, porcelain or other good insulating material, into the space between the tube A and the sleeve E.

In Fig. 3 there is illustrated a butt or end to end joint between two metal tubes A and C. These tubes which may be of steel are each conically flared at their ends. A separator B of properly refractory insulating material in the form of a ring or short tube with its ends tapered to fit the flanging ends of the tubes, is introduced between the tubes. As in the other examples which I have illustrated and described it is preferable to join the metal surfaces to the separator by means of films of a relatively easily fusible vitreous flux applied as at D to the interior of the flaring portions of the tubes A and C. Such joint should be made under combined heat and pressure so as to obtain the useful effects mentioned herein in connection with Fig. 2.

As will be readily understood by one skilled in this art in the light of what has been set forth herein, the details of manipulation will be varied if the two metallic members are made of different metals. If the separator or intermediary is composed of some material other than glass or if the members joined thereby are made of metals whose co-efficients of expansion differ, variations in the nature of composition in the intermediary in respect to its co-efficient of expansion will be necessary in order to secure practically good results. In all cases, however, the characteristic features of my invention will be retained wherever the metal surfaces are so treated with a solvent flux as to provide for the removal of the oxid film, and gaseous bubbles before the union is made between several members, and wherever the co-efficients of expansion of the several members and the manner of their heating and cooling are so adjusted as to prevent undue tension in or between the different members.

For the manufacture of joints between iron or steel tubular members, I prefer to employ for the intermediary sleeve or member, marked B in the drawings, a vitreous composition containing 50 parts soda glass, 50 parts borax, and 12 parts iron oxid, by weight. A vitreous composition of this character and substantially as specified, forms the subject matter of Patent No. 974,801 granted to me November 8, 1910.

What I claim and desire to secure by Letters Patent is:

1. The combination of inner and outer symmetrical coaxial metal members, an insulating intermediary joined thereto, the joint between metallic members and the intermediary involving a low melting vitreous flux, solvent of the oxids of the metal members, and in close adhesive association with said members, one of said metal members provided with an enlarged tubular extension to surround the body of the other metal member, with an annular space therebetween and an insulating sleeve between said extension and the metal member surrounded thereby.

2. The combination of two tubular metal members, each having a conical termination, an insulating intermediary fitted between said conical terminations and making joint therewith, said joint comprising a glaze in close adhesive association with said intermediary and metal members, and characterized by a melting point lower than that of either the metal members or the intermediary.

3. The combination of two tubular metal members, each having a conical termination, an insulating intermediary fitted between said conical terminations and making joint therewith, said joint involving a vitreous flux solvent of the oxids of the metal members, in close adhesive association with said metal members, and characterized by a melting point lower than that of either of the metal members.

4. The combination with an outer tubular member, a lining of insulating material intimately joined to the said outer tubular member and extending inward from the end thereof, and an inner metallic tubular member in intimate contact with the interior surface of the lining at a region removed from the end of the outer tubular member, the lined portion of said outer member extending beyond the region of contact between the inner tubular member and the lining.

5. The combination of an outer tubular member, a lining of insulating material intimately joined to the said outer tubular member and extending inward from the end thereof, and an inner metallic tubular member in intimate contact with the interior surface of the lining at a region removed from the end of the outer tubular member, the lined portion of said outer member extending beyond the region of contact between the inner tubular member and the lining.

6. The combination of an outer tubular member, a lining of insulating material intimately joined to the said outer tubular member and extending inward from the end thereof, and an inner metallic tubular member in intimate contact with the interior surface of the lining at a region removed from the end of the outer tubular member, the lined portion of said outer member extending beyond the region of contact between the inner tubular member and the lining and spaced away from the inner tubular member.

7. The combination of an outer tubular member, a lining of insulating material intimately joined to the said outer tubular member and extending inward from the end thereof, and an inner metallic tubular member in intimate contact with the interior surface of the lining at a region removed from the end of the outer tubular member, the lined portion of said outer member extending beyond the region of contact between the inner tubular member and the lining and spaced away from the inner tubular member, and a loosely fitting insulating sleeve between the inner tubular member and the end-portion of the lined outer tubular member.

Signed by me at Boston, Massachusetts, this 23d day of August 1909.

CHARLES A. KRAUS.

Witnesses:
GILBERT N. LEWIS,
ROY D. MAILEY.